(12) United States Patent
Wu

(10) Patent No.: US 12,317,014 B2
(45) Date of Patent: May 27, 2025

(54) TRAINING SEQUENCE DETERMINING METHOD AND RELATED DEVICE

(71) Applicant: Huawei Technologies Co., Ltd., Shenzhen (CN)

(72) Inventor: Xuming Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/067,394

(22) Filed: Dec. 16, 2022

(65) Prior Publication Data

US 2023/0123881 A1 Apr. 20, 2023

Related U.S. Application Data

(63) Continuation of application No. PCT/CN2021/099064, filed on Jun. 9, 2021.

(30) Foreign Application Priority Data

Jun. 19, 2020 (CN) .......................... 202010567253.2

(51) Int. Cl.
*H04Q 11/00* (2006.01)

(52) U.S. Cl.
CPC ..... *H04Q 11/0067* (2013.01); *H04Q 11/0005* (2013.01); *H04Q 2011/0045* (2013.01)

(58) Field of Classification Search
CPC .................................................. H04Q 11/0067
See application file for complete search history.

(56) References Cited

U.S. PATENT DOCUMENTS

| | | | | |
|---|---|---|---|---|
| 2015/0288480 A1* | 10/2015 | Khotimsky | ........ | H04Q 11/0067 398/68 |
| 2017/0279941 A1* | 9/2017 | Zhang | ..................... | H04B 10/40 |
| 2019/0116404 A1* | 4/2019 | Zheng | ..................... | H04B 10/27 |
| 2021/0289274 A1* | 9/2021 | Khotimsky | ........ | H04Q 11/0067 |
| 2023/0208542 A1* | 6/2023 | Krampl | ................. | H04J 3/0605 398/43 |

FOREIGN PATENT DOCUMENTS

| | | |
|---|---|---|
| CN | 103634054 A | 3/2014 |
| CN | 105704073 A | 6/2016 |
| CN | 108494488 A | 9/2018 |
| CN | 108667524 A | 10/2018 |
| EP | 2961086 A2 | 12/2015 |
| WO | 2017214859 A1 | 12/2017 |
| WO | 2019165980 A1 | 9/2019 |
| WO | 2020051753 A1 | 3/2020 |

* cited by examiner

*Primary Examiner* — Shi K Li
(74) *Attorney, Agent, or Firm* — Slater Matsil, LLP (57) ABSTRACT

This application provides a training sequence determining method and a related device. The method in embodiments of this application includes: An ONU receives a first message sent by an OLT. Then, the ONU determines a target training sequence based on the first message, where the target training sequence is used to determine a working parameter of an equalizer in the OLT. Further, the ONU generates a first data frame including the target training sequence. In this application, the OLT may perform training based on the received target training sequence to determine the working parameter of the equalizer in the OLT.

19 Claims, 9 Drawing Sheets

TRAINING SEQUENCE DETERMINING METHOD AND RELATED DEVICE

CROSS-REFERENCE TO RELATED APPLICATIONS

This application is a continuation of International Application No. PCT/CN2021/099064, filed on Jun. 9, 2021, which claims priority to Chinese Patent Application No. 202010567253.2, filed on Jun. 19, 2020. The disclosures of the aforementioned applications are hereby incorporated by reference in their entireties.

TECHNICAL FIELD

This application relates to the optical communications field, and in particular, to a training sequence determining method and a related device.

BACKGROUND

As access bandwidth increases, a line rate of a passive optical network (Passive Optical Network, PON) also needs to be gradually increased. PON series standards of the International Telecommunication Union (ITU) develop from GPON to 10G PON, and then to 50G PON currently under discussion. Accordingly, the line rate increases from 2.5 Gbit/s to 10 Gbit/s, and then to 50 Gbit/s.

Because the line rate of the PON increases, bandwidth supported by an optical component may be insufficient to meet a bandwidth requirement of the high-speed PON, and mutual interference occurs between adjacent code types transmitted in the PON system. As a result, an intersymbol interference (ISI) phenomenon occurs, and performance of the OLT is affected.

SUMMARY

This application provides a training sequence determining method and a related device. An ONU determines a training sequence based on an indication of an OLT, and sends the training sequence to the OLT. The OLT determines a working parameter of an equalizer based on the training sequence, and the equalizer may compensate for channel impairment and effectively eliminate ISI, thereby improving performance of the OLT.

According to a first aspect, this application provides a training sequence determining method. The method is specifically performed by an ONU. First, the ONU receives a first message sent by an OLT. Then, the ONU determines a target training sequence based on the first message, where the target training sequence is used to determine a working parameter of an equalizer in the OLT. Further, the ONU generates a first data frame including the target training sequence.

In this implementation, the ONU determines the target training sequence based on an indication of the OLT, and generates the first data frame including the target training sequence, so that after receiving the first data frame sent by the ONU, the OLT may perform training based on the target training sequence to determine the working parameter of the equalizer in the OLT. The equalizer may compensate for channel impairment and effectively eliminate ISI, thereby improving performance of the OLT.

Optionally, in some possible implementations, a first field in the first message includes an original sequence, and that the ONU determines a target training sequence based on the first message includes: The ONU generates the target training sequence based on the original sequence and a preset operation rule, where a length of the target training sequence is greater than a length of the original sequence. In this implementation, a specific implementation of determining the target training sequence by the ONU is provided, thereby improving practicability of the solution. In addition, the length of the target training sequence determined by the ONU better meets a training requirement of the equalizer in the OLT, so that a better working parameter may be determined, and performance of the equalizer may be improved.

Optionally, in some possible implementations, a second field in the first message is used to indicate a quantity of cycles of the target training sequence based on a code type of the target training sequence. For example, in a target training sequence "100110101111000100110101110 00 . . . ", an underlined part indicates a code type (15 bits in total) of the target training sequence, and every 15 bits are one cycle. In this case, the second field may indicate a quantity of cycles of the 15 bits. That is, if the quantity of cycles is 100, a target training sequence of accumulated 1500 bits may be provided to meet the training requirement of the equalizer in the OLT.

Optionally, in some possible implementations, a first field in the first message is used to indicate a training sequence type, and that the ONU determines a target training sequence based on the first message includes: The ONU selects the target training sequence from a preset training sequence list based on the training sequence type indicated by the first field. It should be understood that the training sequence type includes one attribute or a combination of a plurality of attributes in a code type of the training sequence, a length of the training sequence, and a quantity of cycles for sending the training sequence. For example, the first field indicates the length of the training sequence, and in this case, the ONU selects, from the preset training sequence list, a target training sequence that matches the length indicated by the first field. Alternatively, the first field indicates the code type of the training sequence and a quantity of cycles based on the code type, and in this case, the ONU selects, from the preset training sequence list, a target training sequence that matches the code type and the quantity of cycles. In this implementation, another specific implementation of determining the target training sequence by the ONU is provided, thereby improving scalability of the solution.

Optionally, in some possible implementations, the first data frame further includes a delimiter of the target training sequence and service data, and the target training sequence, the delimiter of the target training sequence, and the service data are sequentially arranged from front to back. Alternatively, the first data frame further includes a first upstream physical synchronization block (PSBu), a delimiter of the target training sequence, and service data. The first PSBu further includes a preamble and a delimiter of the preamble. In addition, a position of the first PSBu in the first data frame may be located in front of the target training sequence. Alternatively, a position of the first PSBu in the first data frame may be located between the delimiter of the target training sequence and the service data. In this implementation, a plurality of different uplink data frame structures are provided, thereby enriching the implementation of the solution.

Optionally, in some possible implementations, after generating the first data frame including the target training sequence, the ONU further sends the first data frame to the OLT, so that the OLT determines the working parameter of the equalizer of the OLT based on the target training sequence.

Optionally, in some possible implementations, that the ONU sends the first data frame to the OLT specifically includes: The ONU receives a second message sent by the OLT; and the ONU sends the first data frame to the OLT based on an indication of the second message. In this implementation, after receiving the indication sent by the OLT, the ONU sends the first data frame including the target training sequence to the OLT. In this implementation, a mechanism for reporting the target training sequence by the ONU is provided, thereby improving scalability of the solution.

Optionally, in some possible implementations, the second message includes a bandwidth mapping table, and an allocation structure in the bandwidth mapping table includes a training indicator field. That the ONU sends the first data frame to the OLT based on an indication of the second message includes: The ONU sends the first data frame to the OLT based on an indication of the training indicator field. In this implementation, the OLT adds the training indicator field to the bandwidth mapping table used to allocate uplink bandwidth, and indicates, by using the training indicator field, that the ONU needs to send the target training sequence. The OLT reuses the existing bandwidth mapping table, and does not need to separately send an indication message to the ONU. This implementation is more practical.

Optionally, in some possible implementations, the method further includes: The ONU receives a third message sent by the OLT; and the ONU sends a second data frame to the OLT based on an indication of the third message, where the second data frame includes a second PSBu and service data. In some possible implementations, if the OLT already determines the working parameter of the equalizer based on the training sequence sent by the ONU, an uplink data frame sent by the ONU to the OLT does not need to carry the target training sequence, thereby reducing unnecessary overheads.

Optionally, in some possible implementations, the third message includes a bandwidth mapping table, and an allocation structure in the bandwidth mapping table includes a training indicator field. That the ONU sends a second data frame to the OLT based on an indication of the third message includes: The ONU sends the second data frame to the OLT based on an indication of the training indicator field. In this implementation, the OLT adds the training indicator field to the bandwidth mapping table used to allocate uplink bandwidth, and indicates, by using the training indicator field, that the ONU does not need to send the target training sequence. The OLT reuses the existing bandwidth mapping table, and does not need to separately send an indication message to the ONU. This implementation is more practical.

Optionally, in some possible implementations, there are a plurality of target training sequences, each target training sequence has a corresponding identifier, and a burst profile in the allocation structure is used to indicate the identifier. Content indicated by the identifier may include the training sequence, a quantity of cycles for sending the training sequence, a delimiter of the training sequence, and the like. In this implementation, the ONU may send, based on an indication of the OLT, a training sequence most needed by the OLT, so that the equalizer can determine a better working parameter to better compensate for channel impairment.

Optionally, in some possible implementations, the first message is a physical layer operations, administration and maintenance (Physical Layer Operations, Administration and Maintenance, PLOAM) message.

According to a second aspect, this application provides a training sequence determining method. The method is specifically performed by an OLT. The OLT sends a first message to an ONU, so that the ONU determines a target training sequence based on the first message, and generates a first data frame including the target training sequence. The target training sequence is used to determine a working parameter of an equalizer in the OLT.

Optionally, in some possible implementations, a first field in the first message includes an original sequence, the target training sequence is generated by the ONU based on the original sequence and a preset operation rule, and a length of the target training sequence is greater than a length of the original sequence.

Optionally, in some possible implementations, a first field in the first message is used to indicate a training sequence type, and the target training sequence is selected by the ONU from a preset training sequence list based on the training sequence type indicated by the first field.

Optionally, in some possible implementations, the first data frame further includes a delimiter of the target training sequence and service data, or the first data frame further includes a first PSBu, a delimiter of the target training sequence, and service data.

Optionally, in some possible implementations, the method further includes: The OLT receives the first data frame sent by the ONU.

Optionally, in some possible implementations, that the OLT receives the first data frame sent by the ONU specifically includes: The OLT sends a second message to the ONU, where the second message is used to indicate the ONU to send the first data frame; and the OLT receives the first data frame sent by the ONU.

Optionally, in some possible implementations, the second message includes a bandwidth mapping table, an allocation structure in the bandwidth mapping table includes a training indicator field, and the training indicator field is used to indicate the ONU to send the first data frame.

Optionally, in some possible implementations, the method further includes: The OLT sends a third message to the ONU, where the third message is used to indicate the ONU to send a second data frame, and the second data frame includes a second PSBu and service data; and the OLT receives the second data frame sent by the ONU.

Optionally, in some possible implementations, the third message includes a bandwidth mapping table, an allocation structure in the bandwidth mapping table includes a training indicator field, and the training indicator field is used to indicate the ONU to send the second data frame.

Optionally, in some possible implementations, there are a plurality of target training sequences, each target training sequence has a corresponding identifier, and a burst profile in the allocation structure is used to indicate the identifier.

Optionally, in some possible implementations, the first message is a PLOAM message.

According to a third aspect, this application provides an ONU, including a processor, a memory, and an optical transceiver. The processor, the memory, and the optical transceiver are connected to each other by using a line, and the processor invokes program code in the memory to perform the training sequence determining method shown in any implementation of the first aspect.

According to a fourth aspect, this application provides an OLT, including a processor, a memory, and an optical transceiver. The processor, the memory, and the optical transceiver are connected to each other by using a line, and the processor invokes program code in the memory to perform the training sequence determining method shown in any implementation of the second aspect.

According to a fifth aspect, this application provides a passive optical network. The passive optical network includes the ONU shown in the third aspect and the OLT shown in the fourth aspect.

According to a sixth aspect, this application provides a computer-readable storage medium. The computer-readable storage medium stores a computer program. When the computer program is executed by hardware, some or all of the steps of any method performed by the ONU in the first aspect can be implemented.

According to a seventh aspect, this application provides a computer-readable storage medium. The computer-readable storage medium stores a computer program. When the computer program is executed by hardware, some or all of the steps of any method performed by the OLT in the second aspect can be implemented.

In embodiments of this application, the ONU determines the target training sequence based on the message sent by the OLT. Then, the uplink data frame generated by the ONU includes the target training sequence. Further, the OLT may perform training based on the received target training sequence, to determine the working parameter of the equalizer in the OLT. The equalizer may compensate for channel impairment and effectively eliminate ISI, thereby improving performance of the OLT.

DETAILED DESCRIPTION OF ILLUSTRATIVE EMBODIMENTS

This application provides a training sequence determining method and a related device. An ONU determines a training sequence based on an indication of an OLT, and sends the training sequence to the OLT. The OLT determines a working parameter of an equalizer based on the training sequence, and the equalizer may compensate for channel impairment and effectively eliminate ISI, thereby improving performance of the OLT.

Currently, broadband access technologies are mainly classified into copper wire access technologies (such as various DSL technologies) and optical access technologies. An access network implemented by using an optical access technology is referred to as an optical access network (OAN).

A passive optical network (PON) is an implementation technology of the optical access network, and the PON is an optical access technology of point-to-multipoint transmission. The following describes a system architecture of the PON.

Figure 1:
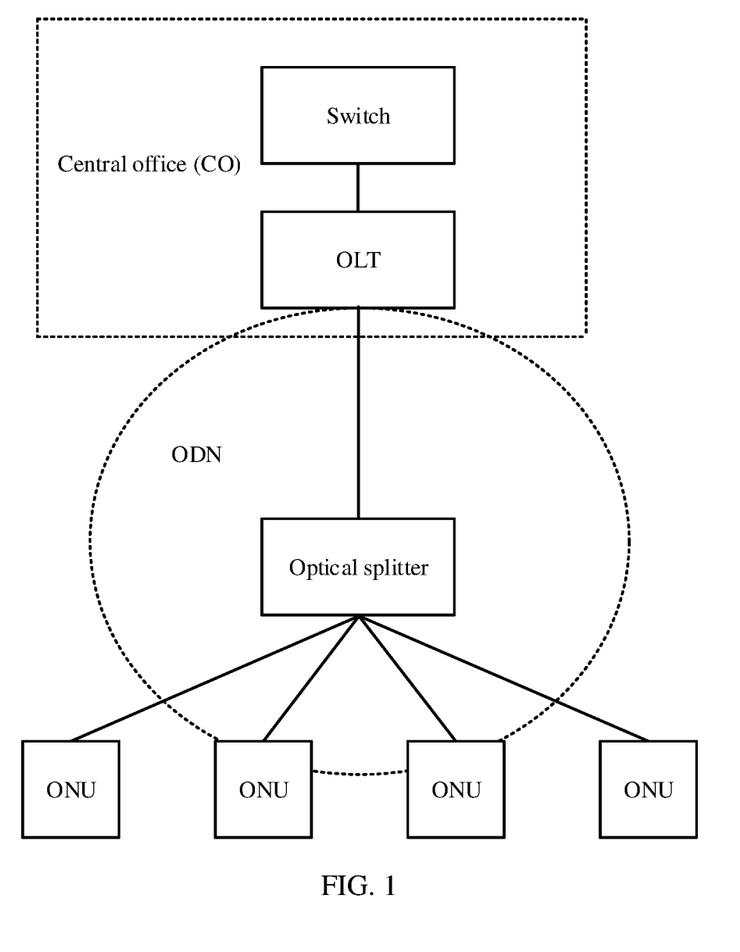
FIG. 1 is a schematic diagram of a system architecture of a PON.

FIG. 1 is a schematic diagram of a system architecture of a PON. An OLT is configured to provide a network side interface for an OAN. The OLT is connected to an upper-layer network side device (for example, a switch or a router), and is connected to one or more optical distribution networks (ODN) at a lower layer.

The ODN includes a passive optical splitter used for optical power distribution, a backbone optical fiber connected between the passive optical splitter and the OLT, and a branch optical fiber connected between the passive optical splitter and an ONU. During downlink data transmission, the ODN transmits downlink data of the OLT to each ONU by using the optical splitter, and the ONU selectively receives downlink data carrying an identifier of the ONU. During uplink data transmission, the ODN combines optical signals sent by N ONUs into one optical signal, and transmits the optical signal to the OLT.

The ONU provides a user side interface for the OAN, and is connected to the ODN. If the ONU provides a user port function at the same time, for example, the ONU provides an Ethernet user port or a plain old telephone service (POTS) user port, the ONU is referred to as an optical network termination (ONT).

As a line rate of the PON increases, there is a higher requirement for bandwidth of an optical component. Because the bandwidth supported by the optical component is insufficient to meet a bandwidth requirement of the high-speed PON, mutual interference occurs between adjacent code types transmitted in the PON system. As a result, an ISI phenomenon occurs, and performance of the OLT is affected. Therefore, in this application, an equalizer is used in the OLT to eliminate ISI and compensate for bandwidth.

Figure 2:
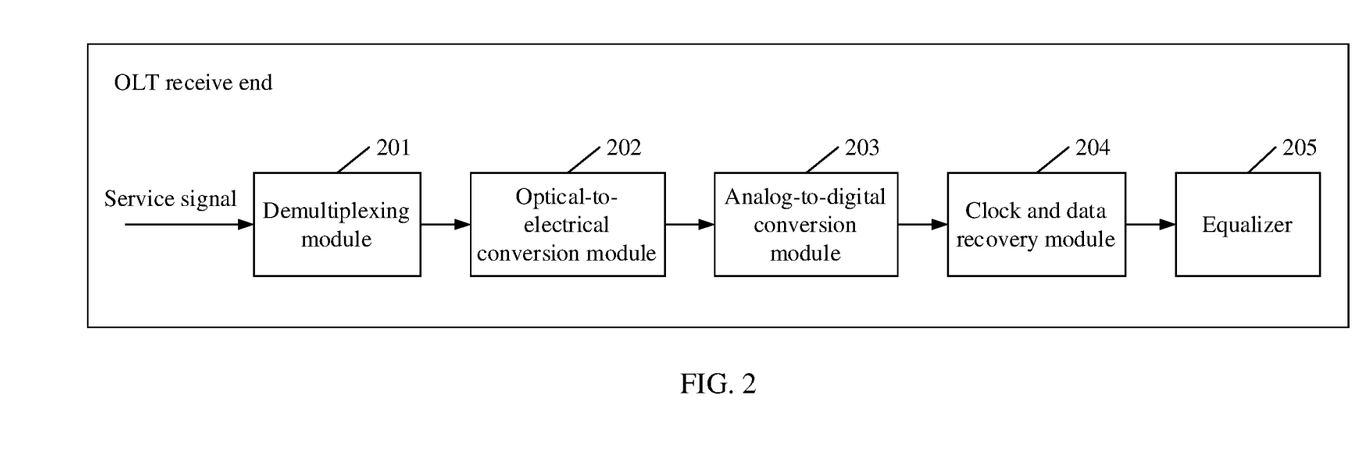
FIG. 2 is a schematic diagram of a structure of an OLT receive end according to this application.

FIG. 2 is a schematic diagram of a structure of an OLT receive end according to this application. A demultiplexing module 201 is configured to perform demultiplexing on a service signal from a channel. An optical-to-electrical conversion module 202 is configured to convert an optical signal obtained after the demultiplexing into an electrical signal, and output the electrical signal to an analog-to-digital conversion module 203. The analog-to-digital conversion module 203 is configured to convert the electrical signal into a digital signal, and output the digital signal to a clock and data recovery module 204. The clock and data recovery module 204 is configured to recover a clock of data. An equalizer 205 is configured to eliminate intersymbol interference.

It should be noted that the OLT needs to receive uplink signals from different ONUs. Optical components used by different ONUs are different, and distances from different ONUs to the OLT are also different. Therefore, for different ONUs, different working parameters need to be configured for the equalizer in the OLT. Specifically, the OLT determines a working parameter of the equalizer based on a training sequence sent by an ONU. The following describes in detail the training sequence determining method provided in this application.

Figure 3:
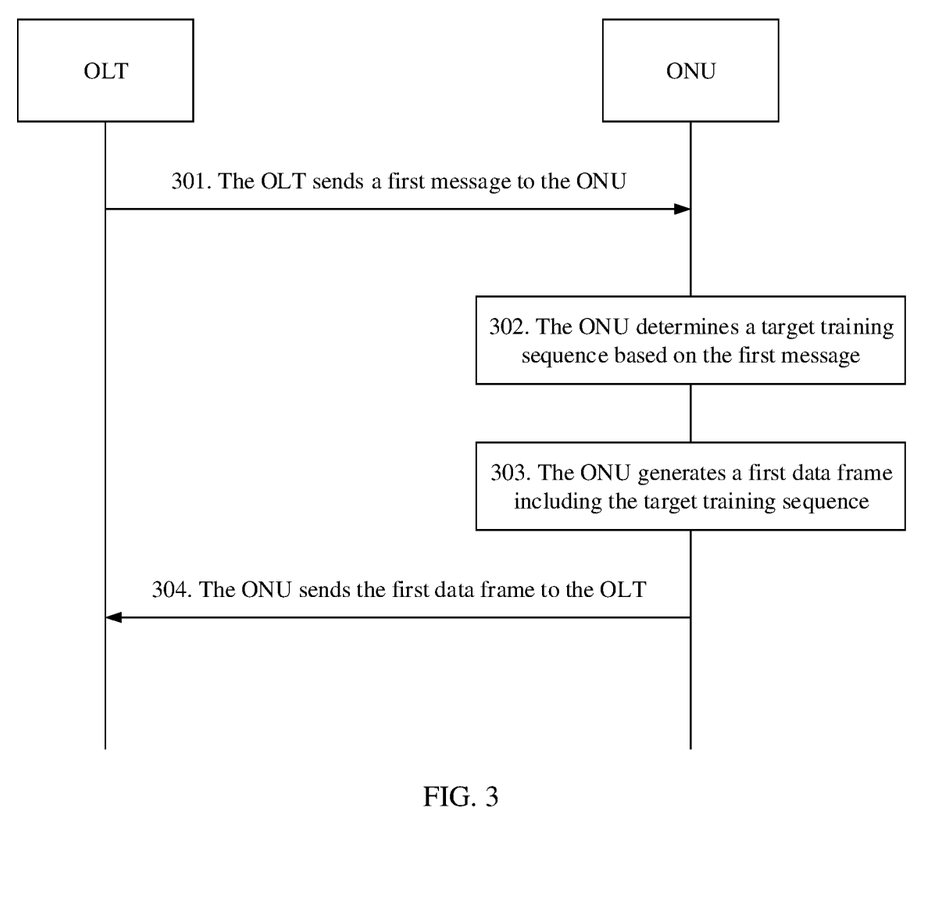
FIG. 3 is a schematic diagram of a first embodiment of a training sequence determining method according to this application.

FIG. 3 is a schematic diagram of a first embodiment of a training sequence determining method according to this application. In this example, the training sequence determining method includes the following steps.

301. An OLT sends a first message to an ONU.

In this embodiment, the first message may be a physical layer operations, administration and maintenance (PLOAM) message in a GPON standard. The PLOAM message may be sent in a broadcast manner, or may be sent in a unicast manner. The PLOAM message may provide functions such as configuration of an uplink burst mode, ONU activation, and ONU registration.

302. The ONU determines a target training sequence based on the first message.

It should be understood that the target training sequence is different from service data, and the target training sequence is a sequence used to determine a working parameter of an equalizer in the OLT. The target training sequence may be located in an overhead part of an uplink message sent by the ONU. Specifically, the ONU determines the target training sequence in a plurality of implementations, which are separately described below.

First Implementation:

A first field in the first message delivered by the OLT includes an original sequence, and the ONU processes the original sequence based on a preset operation rule to obtain a random sequence, that is, the target training sequence. A length of the target training sequence is greater than a length of the original sequence (for example, greater than 256 bits), so that the length of the target training sequence meets a training requirement of the equalizer in the OLT.

Figure 4:
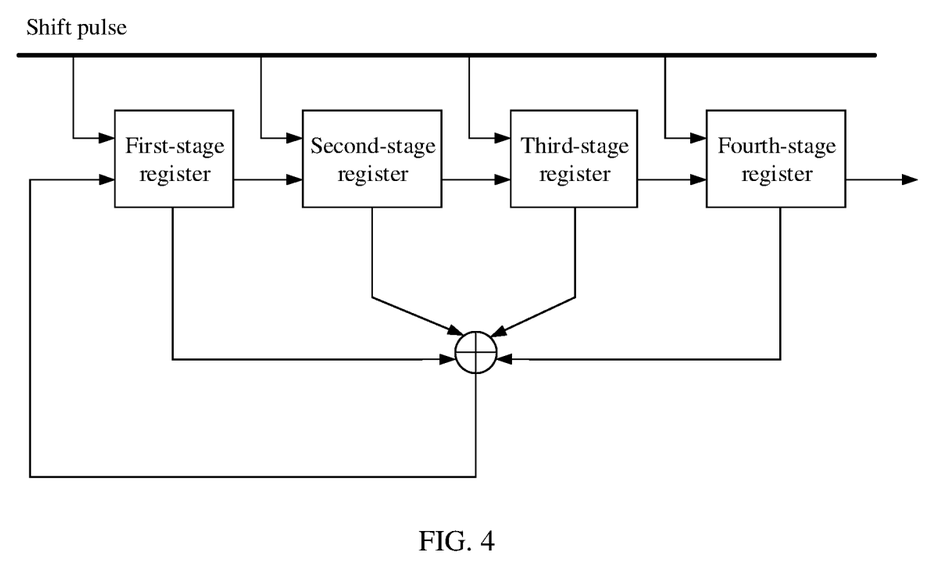
FIG. 4 is a schematic diagram of a structure of a linear feedback shift register according to this application.

It should be noted that the target training sequence may be a pseudo-random sequence, for example, an m sequence. The ONU may generate the target training sequence by using a linear feedback shift register. FIG. 4 is a schematic diagram of a structure of a linear feedback shift register according to this application. The linear feedback shift register includes four stages of registers. Specifically, an initial value is first assigned to all registers, and a value of each register is 0 or 1. For example, initial values of a first-stage register to a fourth-stage register are successively "1001". It should be understood that "1001" is the foregoing original sequence. When a shift pulse arrives, a value of the register at the last stage is output, and content of a register at an $i^{th}$ stage is stored in a register at an $(i+1)^{th}$ stage. In addition, a value is calculated from output of the register at each stage based on a specific linear operation rule, and the value is stored in the first-stage register. With accumulation of shift pulses, output of the linear feedback shift register may form a sequence, that is, the target training sequence. Moreover, because a register status is finite, the finally output target training sequence is a cyclic sequence based on a specific code type. Optionally, the first message further includes a second field, and the second field is used to indicate a quantity of cycles of the target training sequence based on a specific code type. For example, in a target training sequence "100110101111000100110101 11000 . . . ", an underlined part indicates a code type (15 bits in total) of the target training sequence, and every 15 bits are one cycle. In this case, the second field may indicate a quantity of cycles of the 15 bits. That is, if the quantity of cycles is 100, a target training sequence of accumulated 1500 bits may be provided to meet the training requirement of the equalizer in the OLT.

Second Implementation:

A first field in the first message delivered by the OLT is used to indicate a training sequence type. Further, the ONU selects, from a preset training sequence list, a training sequence that matches the type, to serve as or generate the target training sequence. The training sequence type may be specifically an enumerated value or a number. In the preset training sequence list, any type of training sequence includes one or more types of information, such as a code type of the training sequence, a length of the training sequence, and a quantity of cycles of the training sequence based on the code type of the training sequence. The ONU selects a corresponding training sequence from the training sequence list based on the training sequence type, to generate the target training sequence. For example, the first field indicates that the training sequence type is a type 1, and in the preset training sequence list, a code type of a training sequence of the type 1 is "100110101111000", and a quantity of cycles is 100. In this case, the target training sequence is a 1500-bit cyclic sequence "100110101111000100110101111000 . . . ". The training sequence type indicated by the first field may alternatively be specifically an attribute of the training sequence, for example, one attribute or a combination of a plurality of attributes, such as a code type of the training sequence, a length of the training sequence, and a quantity of cycles of the training sequence based on the code type of the training sequence. For example, the training sequence type indicated by the first field is specifically the length of the training sequence, and in this case, the ONU selects, from the preset training sequence list, a training sequence that matches the length indicated by the first field, to serve as the target training sequence. Alternatively, the training sequence type indicated by the first field is specifically the code type of the training sequence and the quantity of cycles based on the code type, and in this case, the ONU selects, from the preset training sequence list, a training sequence that matches the code type and the quantity of cycles, to serve as or generate the target training sequence. In a possible implementation, the preset training sequence list includes four types of training sequences, and the first field includes two bits. The first field of "00" is used to indicate a training sequence type 1, the first field of "01" is used to indicate a training sequence type 2, the first field of "10" is used to indicate a training sequence type 3, and the first field of "11" is used to indicate a training sequence type 4.

303. The ONU generates a first data frame including the target training sequence.

In this embodiment, there may be a plurality of formats of the first data frame, which are separately described below.

Figure 5:
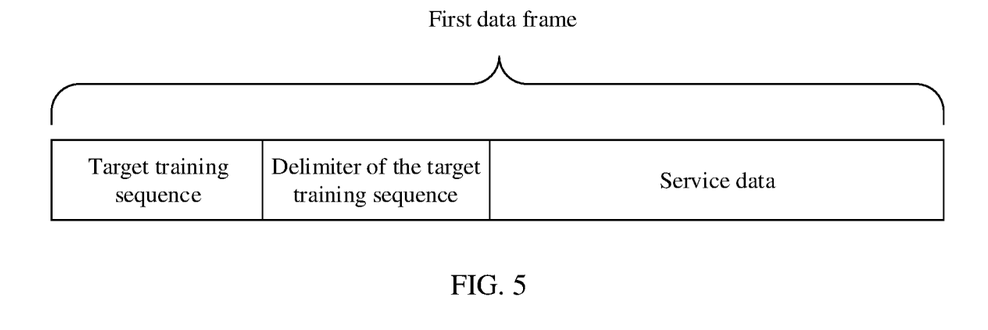
FIG. 5 is a schematic diagram of a first structure of a first data frame according to this application.

FIG. 5 is a schematic diagram of a first structure of a first data frame according to this application. The first data frame successively includes the target training sequence, a delimiter of the target training sequence, and service data. The delimiter of the target training sequence is used to indicate a stop bit of the target training sequence.

Figure 6:
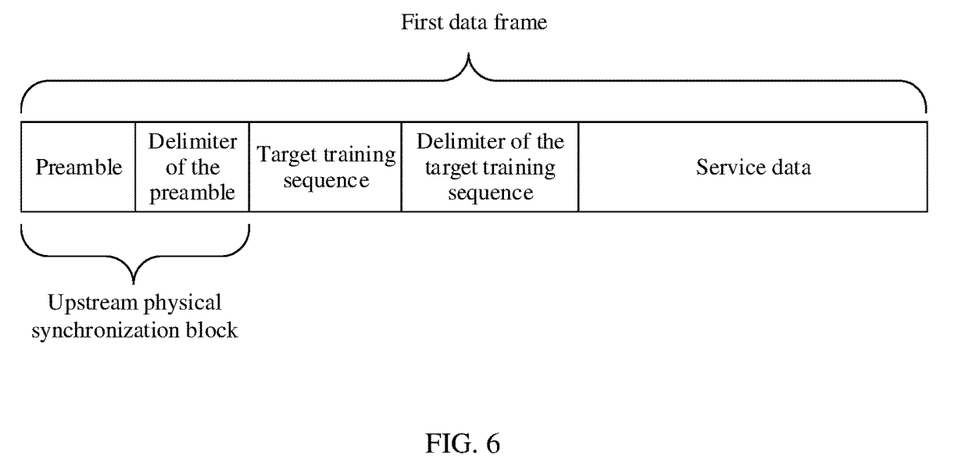
FIG. 6 is a schematic diagram of a second structure of a first data frame according to this application.

FIG. 6 is a schematic diagram of a second structure of a first data frame according to this application. Based on the data frame format shown in FIG. 5, the first data frame may further include an upstream physical synchronization block (Upstream physical synchronization block, PSBu). The PSBu further includes a preamble and a delimiter of the preamble. The delimiter of the preamble is used to indicate a stop bit of the preamble.

Figure 7:
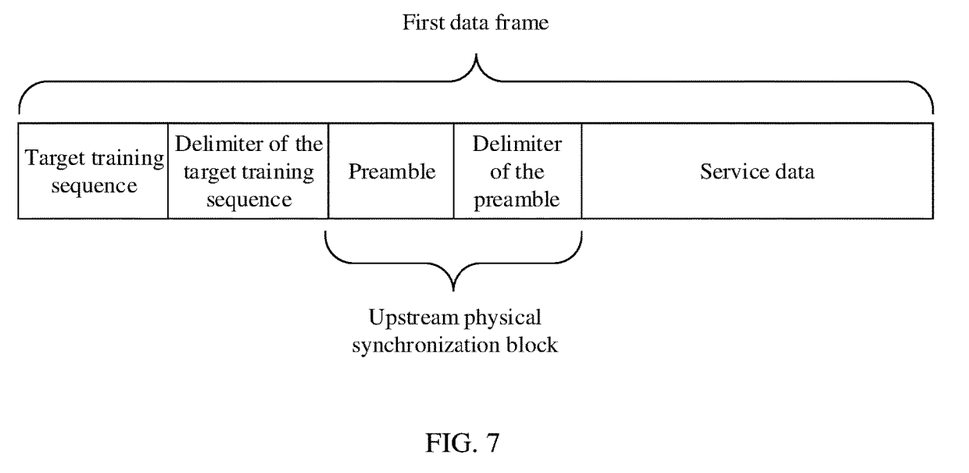
FIG. 7 is a schematic diagram of a third structure of a first data frame according to this application.

Optionally, a position of the PSBu in the first data frame may be located in front of the target training sequence, as shown in FIG. 6. Alternatively, FIG. 7 is a schematic diagram of a third structure of a first data frame according to this application. A position of the PSBu in the first data frame may be located between the delimiter of the target training sequence and the service data, as shown in FIG. 7.

304. The ONU sends the first data frame to the OLT.

The ONU sends the first data frame including the target training sequence to the OLT. Further, the OLT trains the equalizer by using the target training sequence, to determine the working parameter of the equalizer. Specifically, when the equalizer is implemented by a filter, the working parameter of the equalizer may be understood as a filtering coefficient of the filter. The equalizer evaluates a channel characteristic with reference to the training sequence and a recursion algorithm, to correct the filtering coefficient to compensate for channel impairment.

A process in which the equalizer determines the working parameter of the equalizer based on the target training sequence is affected by a plurality of factors, such as an algorithm of the equalizer, a structure of the equalizer, and a communication change rate. In a digital communications system, service data is divided into segments and transmitted in different time segments. Each time the OLT receives service data in a new time segment, the equalizer uses the same training sequence to correct the working parameter of the equalizer.

When the training sequence is designed, it is required that the equalizer can obtain a correct working parameter by using the training sequence even under a worst channel condition. In this way, after the OLT receives the training sequence, the working parameter may be close to an optimal value. Further, when the OLT receives data, an adaptive algorithm of the equalizer may track a constantly changing channel and constantly change the working parameter of the equalizer.

In this embodiment of this application, the ONU determines the target training sequence based on the message sent by the OLT. Then, the uplink data frame generated by the ONU includes the target training sequence. Further, the OLT may perform training based on the received target training sequence, to determine the working parameter of the equalizer in the OLT. The equalizer may compensate for channel impairment and effectively eliminate ISI, thereby improving performance of the OLT.

It should be noted that, in actual application, the uplink data frame sent by the ONU to the OLT does not necessarily carry the training sequence each time. In some possible implementations, the OLT already determines the working parameter of the equalizer based on the training sequence in the uplink data frame sent by the ONU. In this case, to reduce overheads, an uplink data frame sent by the ONU in a later period of time may alternatively not carry the training sequence. Specifically, the OLT indicates whether the ONU needs to send the training sequence. The following provides a further description with reference to an embodiment.

Figure 8:
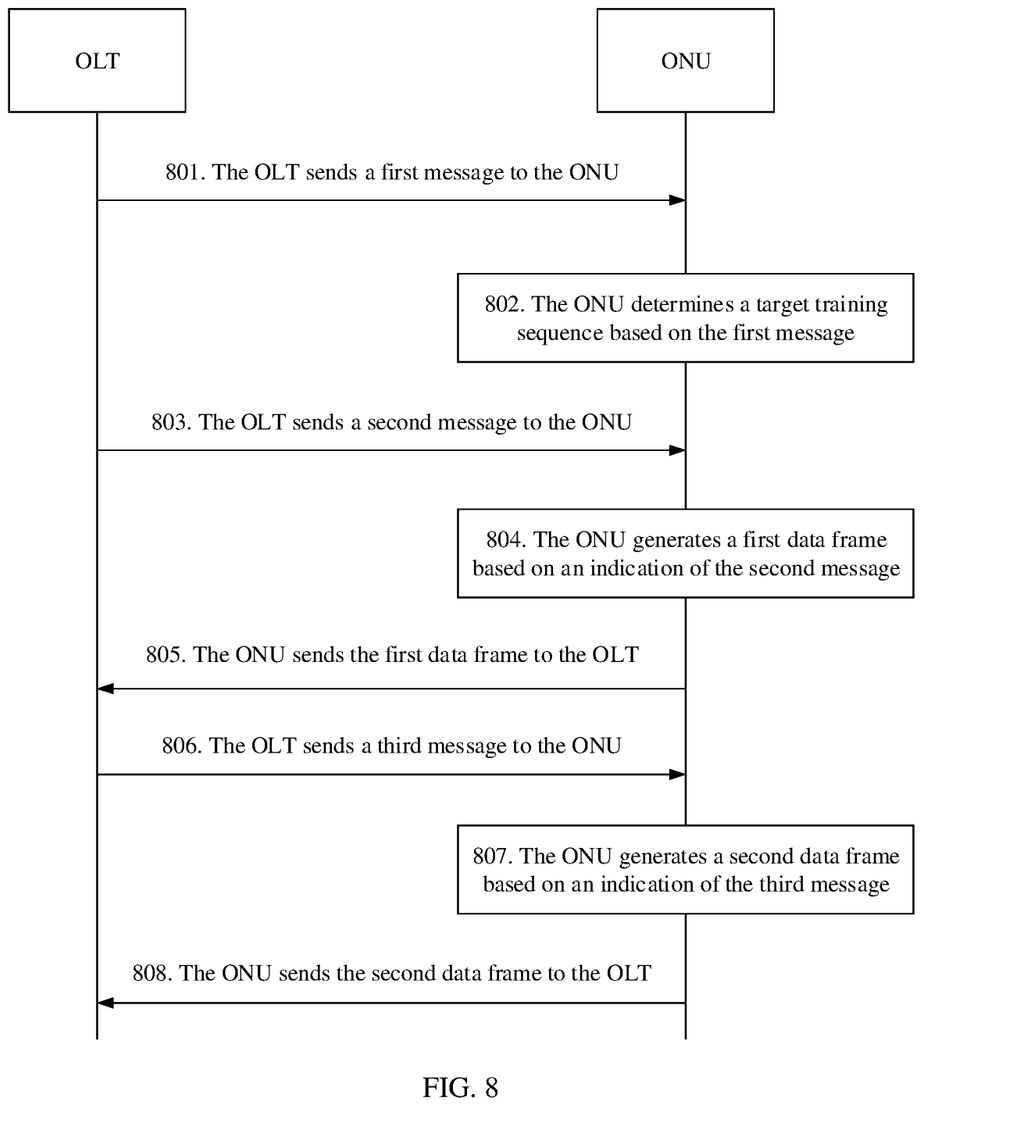
FIG. 8 is a schematic diagram of a second embodiment of a training sequence determining method according to this application.

FIG. 8 is a schematic diagram of a first embodiment of a training sequence determining method according to this application. Based on the step in which the ONU determines the target training sequence described in the embodiment shown in FIG. 3, the embodiment shown in FIG. 8 further describes a step in which the ONU determines, based on an indication of the OLT, whether a data frame including the target training sequence needs to be sent to the OLT. In this example, the training sequence determining method includes the following steps.

801. An OLT sends a first message to an ONU.

802. The ONU determines a target training sequence based on the first message.

In this embodiment, steps 801 and 802 are similar to steps 301 and 302 in the embodiment shown in FIG. 3. Details are not described herein.

803. The OLT sends a second message to the ONU.

In this embodiment, the second message is used to indicate that the ONU needs to send a first data frame including the target training sequence to the OLT. Specifically, the second message includes a bandwidth mapping (bandwidth mapping, BWmap) table. The bandwidth mapping table in this application includes a training indicator field, which may indicate that the ONU needs to send the first data frame including the target training sequence to the OLT. For example, the training indicator field includes 1 bit. When the bit is 1, the ONU needs to send the first data frame including the target training sequence to the OLT. When the bit is 0, the ONU sends a data frame in another format to the OLT. The following provides a detailed description with reference to a specific structure of the bandwidth mapping table.

Figure 9:
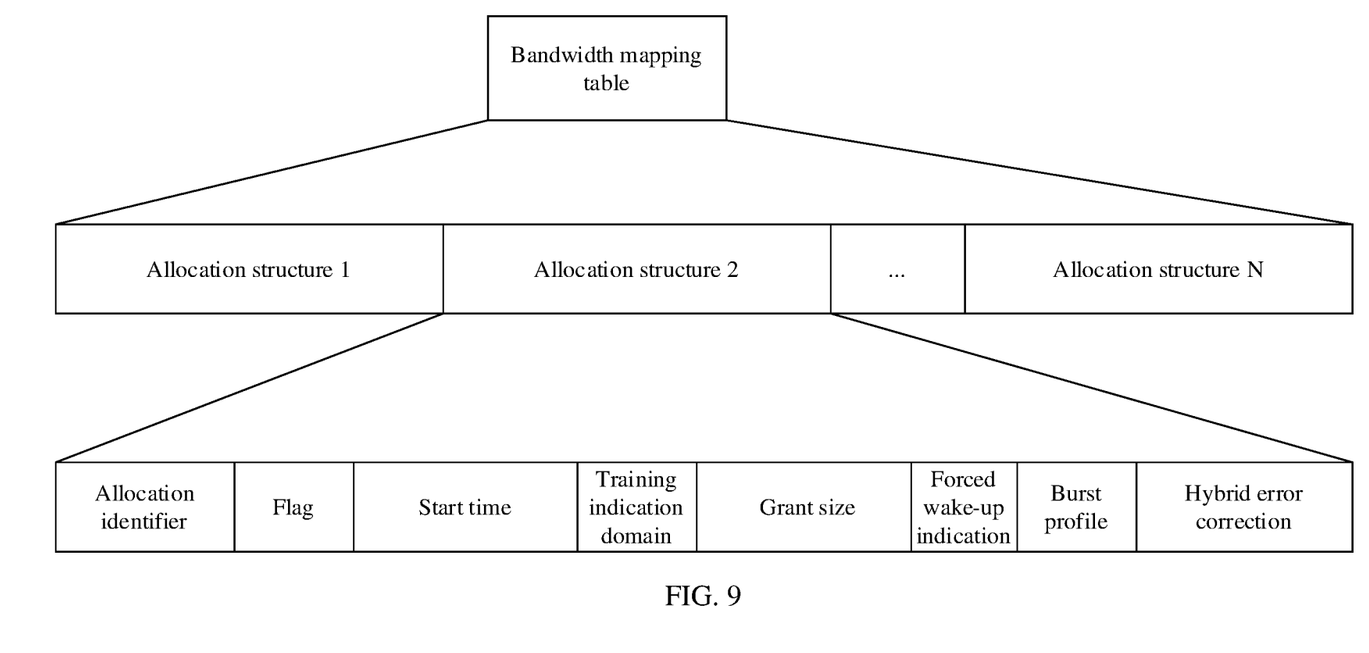
FIG. 9 is a schematic diagram of a structure of a bandwidth mapping table according to this application.

FIG. 9 is a schematic diagram of a structure of a bandwidth mapping table according to this application. The bandwidth mapping table may include one or more allocation structures (allocation structure). The allocation structure includes a plurality of fields, which are respectively an allocation identifier (Alloc-ID), a flag (Flags), a start time (StartTime), a training indicator field, a grant size (GrantSize), a forced wake-up indication (FWI), a burst profile (BurstProfile), and hybrid error correction (HEC). Alloc-ID may indicate a recipient of bandwidth allocation, for example, a specific transmission container (T-CONT) or an uplink ONU management and control channel (OMCC) in the ONU. Flags may include a plurality of flags, and each flag is separately used to indicate different information. For example, Flags includes 2 bits, where 1 bit is used to indicate physical layer operations, administration and maintenance (PLOAMu), and the other bit is used to indicate a dynamic bandwidth report (DBRu). StartTime may indicate a start time of bandwidth allocation for an uplink burst. GrantSize may indicate a length of data transmitted in the bandwidth allocation. BurstProfile may indicate a burst profile of a related uplink burst. HEC may include an error correction indicator.

It should be understood that a position of the training indicator field in the allocation structure shown in FIG. 9 is merely an example. In actual application, the training indicator field may alternatively be located in another position in the allocation structure. This is not specifically limited herein. In addition, the training indicator field may be a field added to an original allocation structure, or idle bits of some fields in the allocation structure may be defined as the training indicator field. For example, an idle bit in StartTime or GrantSize is used to carry the training indicator field.

It should be understood that, in actual application, the "training indicator field" may also have another naming manner, for example, may also be named as a "training field" or a "training sequence indicator field". This is not specifically limited herein.

804. The ONU generates the first data frame based on an indication of the second message.

In this embodiment, a mechanism in which the ONU generates the first data frame is different from step 303 in the embodiment shown in FIG. 3. In the embodiment shown in FIG. 3, after determining the target training sequence, the ONU may generate the first data frame including the target training sequence. However, in this embodiment, after receiving the second message sent by the OLT, the ONU needs to generate, based on the indication of the second message, the first data frame including the target training sequence. In addition, a description about the first data frame is similar to the description of step 303 in the embodiment shown in FIG. 3. Details are not described herein.

805. The ONU sends the first data frame to the OLT.

806. The OLT sends a third message to the ONU.

In this embodiment, the OLT already determines a working parameter of an equalizer based on the target training sequence in the first data frame sent by the ONU. In this case, to reduce overheads, an uplink data frame sent by the ONU in a later period of time may alternatively not carry the target training sequence. Specifically, the third message sent by the OLT to the ONU may indicate that the ONU does not need to further send the target training sequence to the OLT. It should be understood that a structure of the third message is similar to the structure of the second message, and a difference lies only in that the second message is used to indicate the ONU to send the first data frame, and the third message is used to indicate the ONU to send a second data frame. Other same aspects are not described herein.

807. The ONU generates the second data frame based on an indication of the third message.

Figure 10:
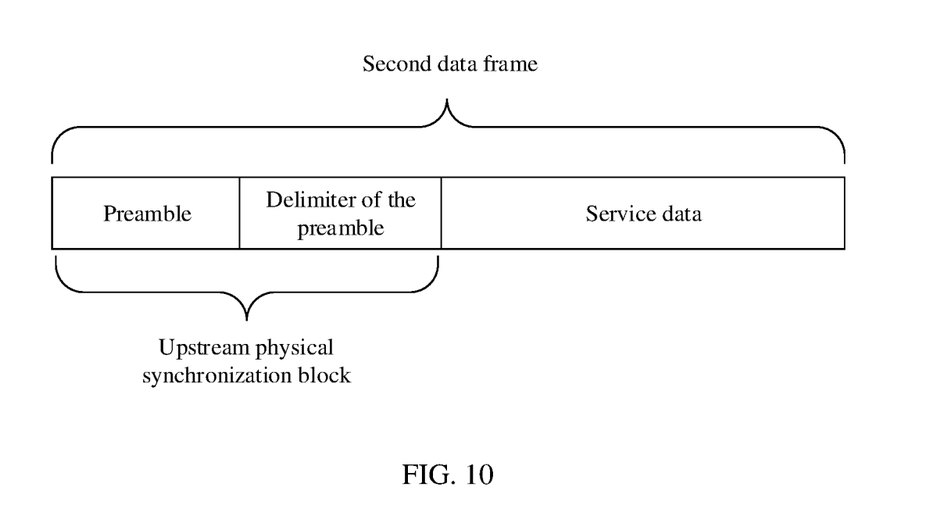
FIG. 10 is a schematic diagram of a structure of a second data frame according to this application.

In this embodiment, the ONU generates, based on the indication of the third message, the second data frame that does not include the target training sequence. FIG. 10 is a schematic diagram of a structure of a second data frame according to this application. The second data frame includes a PSBu and service data. The PSBu further includes a preamble and a delimiter of the preamble.

808. The ONU sends the second data frame to the OLT.

Optionally, in some possible implementations, the ONU generates a plurality of training sequences, and each training sequence has a corresponding identifier. Content indicated by the identifier may include the training sequence, a quantity of cycles for sending the training sequence, a delimiter of the training sequence, and the like. The OLT may indicate an identifier of a required training sequence by using BurstProfile in the allocation structure. Further, the ONU may determine the target training sequence based on the identifier. For example, BurstProfile has 2 bits, and the 2 bits are "00", "01", "10", and "11", respectively indicating identifiers of four different training sequences. It should be noted that, if the training indicator field indicates that the ONU does not need to send the target training sequence to the OLT, BurstProfile may be used to indicate a type of the preamble in the second data frame.

In this embodiment of this application, the bandwidth mapping table sent by the OLT to the ONU includes the training indicator field, and the training indicator field may indicate whether the ONU needs to send the training sequence. If the OLT already determines the working parameter of the equalizer based on the training sequence sent by the ONU, an uplink data frame sent by the ONU to the OLT does not need to carry the target training sequence, thereby reducing unnecessary overheads.

The foregoing describes the training sequence determining method provided in this application, and the following describes an OLT and an ONU provided in this application.

Figure 11:
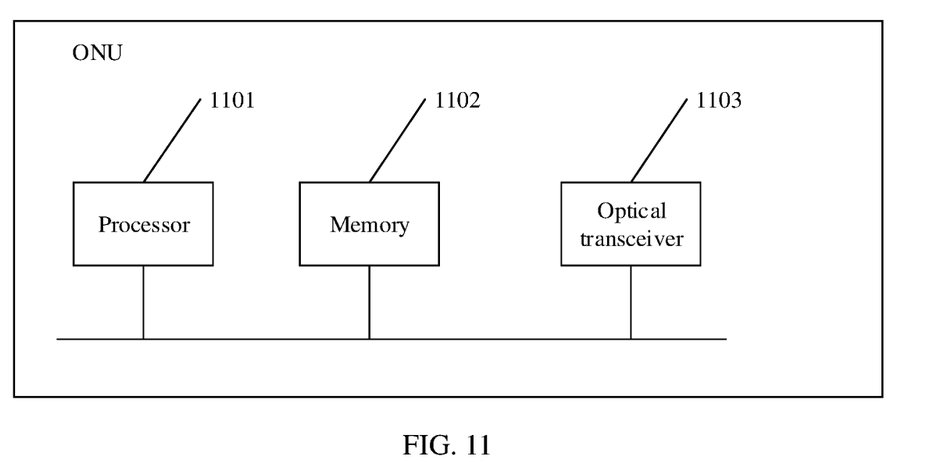
FIG. 11 is a schematic diagram of a structure of a possible ONU.

FIG. 11 is a schematic diagram of a structure of a possible ONU. The ONU includes a processor 1101, a memory 1102, and an optical transceiver 1103. The processor 1101, the memory 1102, and the optical transceiver 1103 are connected to each other by using a line. The memory 1102 is configured to store program instructions and data. It should be noted that the optical transceiver 1103 is configured to perform signal or data receiving and sending operations in the steps shown in FIG. 3 and FIG. 8. The processor 1101 is configured to perform operations other than signal or data receiving and sending in the steps shown in FIG. 3 and FIG. 8.

Figure 12:
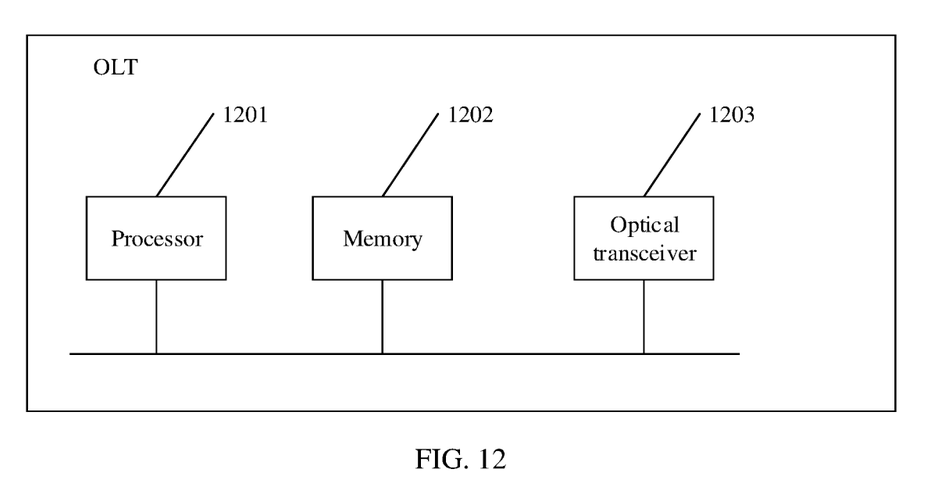
FIG. 12 is a schematic diagram of a structure of a possible OLT.

FIG. 12 is a schematic diagram of a structure of a possible OLT. The OLT includes a processor 1201, a memory 1202, and an optical transceiver 1203. The processor 1201, the memory 1202, and the optical transceiver 1203 are connected to each other by using a line. The memory 1202 is configured to store program instructions and data. It should be noted that the optical transceiver 1203 is configured to perform signal or data receiving and sending operations in the steps shown in FIG. 3 and FIG. 8. The processor 1201 is configured to perform operations other than signal or data receiving and sending in the steps shown in FIG. 3 and FIG. 8. In some possible implementations, the processor 1201 may include the analog-to-digital conversion module 203, the clock and data recovery module 204, and the equalizer 205 that are shown in FIG. 2. Specifically, an electrical signal received by the processor 1201 is successively processed by the analog-to-digital conversion module 203 and the clock and data recovery module 204, and then output to the equalizer 205. Further, the equalizer performs processing to eliminate ISI.

It should be noted that the processors shown in FIG. 11 and FIG. 12 may use a general-purpose central processing unit (CPU), a microprocessor, an application-specific integrated circuit ASIC, or at least one integrated circuit to execute a related program, to implement the technical solutions provided in the embodiments of this application. The memories shown in FIG. 11 and FIG. 12 may store an operating system and another application. When the technical solutions provided in the embodiments of this application are implemented by using software or firmware, program code used to implement the technical solutions provided in the embodiments of this application is stored in the memory, and is executed by the processor. In an embodiment, the memory may be included in the processor. In another embodiment, the processor and the memory are two independent structures.

Figure 13:
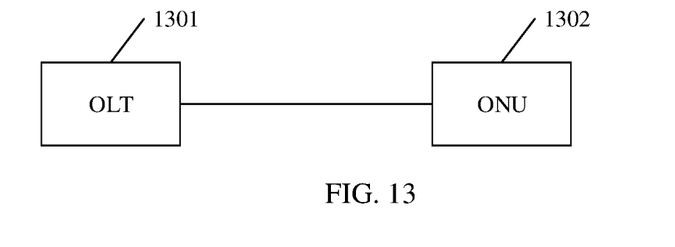
FIG. 13 is a schematic diagram of a structure of a passive optical network according to this application.

FIG. 13 is a schematic diagram of a structure of a passive optical network according to this application. The passive optical network includes an OLT (1301) and an ONU (1302). The OLT (1301) is configured to perform some or all of the steps of any method performed by the OLT in the embodiments shown in FIG. 3 and FIG. 8. The ONU (1302) is configured to perform some or all of the steps of any method performed by the ONU in the embodiments shown in FIG. 3 and FIG. 8.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

Persons of ordinary skill in the art may understand that all or some of the steps of the foregoing embodiments may be implemented by hardware or a program instructing related hardware. The program may be stored in a computer-readable storage medium. The storage medium may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

When implemented by software, the method steps described in the foregoing embodiments may be all or partially implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Finally, it should be noted that: The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method, comprising:
   receiving, by an optical network unit (ONU), a first message sent by an optical line terminal (OLT), wherein a first field in the first message comprises an original sequence;
   receiving, by the ONU, a second message sent by the OLT;
   generating, by the ONU, a first pseudo-random sequence by using a pseudo-random algorithm based on the original sequence, wherein the first pseudo-random sequence is used as a target training sequence, and the target training sequence is used to determine a working parameter of an equalizer in the OLT;
   generating, by the ONU, a first data frame, wherein the first data frame comprises the target training sequence; and
   sending, by the ONU, the first data frame to the OLT based on an indication of the second message.

2. The method according to claim 1, wherein a length of the target training sequence is greater than a length of the original sequence.

3. The method according to claim 1, wherein the first data frame further comprises:
   a delimiter of the target training sequence and service data; or
   a first upstream physical synchronization block (PSBu), a delimiter of the target training sequence, and service data.

4. The method according to claim 1, wherein the second message comprises a bandwidth mapping table, and an allocation structure in the bandwidth mapping table comprises a training indicator field; and
   wherein sending, by the ONU, the first data frame to the OLT based on the indication of the second message comprises:
   sending, by the ONU, the first data frame to the OLT based on an indication of the training indication field.

5. The method according to claim 1, wherein the target training sequence is one of a plurality of target training sequences, and each target training sequence of the plurality of target training sequences corresponds to a respective identifier.

6. The method according to claim 1, further comprising:
   receiving, by the ONU, a third message sent by the OLT; and
   sending, by the ONU, a second data frame to the OLT based on an indication of the third message, wherein the second data frame comprises a second upstream physical synchronization block (PSBu) and service data.

7. The method according to claim 6, wherein the third message comprises a bandwidth mapping table, and an allocation structure in the bandwidth mapping table comprises a training indicator field; and
   wherein sending, by the ONU, the second data frame to the OLT based on the indication of the third message comprises:
   sending, by the ONU, the second data frame to the OLT based on an indication of the training indication field.

8. A method, comprising:
   sending, by an optical line terminal (OLT), a first message and a second message to an optical network unit (ONU), wherein a first field in the first message comprises an original sequence, a first pseudo-random sequence is generated by the ONU by using a pseudo-random algorithm based on the original sequence, the first pseudo-random sequence is used as a target training sequence, and a first data frame is generated by the ONU, and wherein the first data frame comprises the target training sequence;
   receiving, by the OLT, the first data frame sent by the ONU, wherein the first data frame is sent by the ONU based on an indication of the second message; and
   using, by the OLT, the target training sequence to determine a working parameter of an equalizer in the OLT.

9. The method according to claim 8, wherein a length of the target training sequence is greater than a length of the original sequence.

10. The method according to claim 8, wherein the first data frame further comprises:
    a delimiter of the target training sequence and service data; or
    a first upstream physical synchronization block (PSBu), a delimiter of the target training sequence, and service data.

11. The method according to claim 8, wherein the second message comprises a bandwidth mapping table, an allocation structure in the bandwidth mapping table comprises a training indicator field, and the training indicator field indicates to the ONU to send the first data frame.

12. The method according to claim 8, further comprising:
sending, by the OLT, a third message to the ONU, wherein the third message indicates to the ONU to send a second data frame, and the second data frame comprises a second upstream physical synchronization block (PSBu) and service data; and
receiving, by the OLT, the second data frame sent by the ONU.

13. The method according to claim 8, wherein the target training sequence is one of a plurality of target training sequences, and each target training sequence of the plurality of target training sequences corresponds to a respective identifier.

14. An optical network unit (ONU), comprising:
a processor and an optical transceiver, wherein the processor and the optical transceiver are connected to each other, and the processor is configured to:
receive a first message sent by an optical line terminal (OLT), wherein a first field in the first message comprises an original sequence;
receive a second message sent by the OLT;
generate a first pseudo-random sequence by using a pseudo-random algorithm based on the original sequence, wherein the first pseudo-random sequence is used as a target training sequence, and the target training sequence is used to determine a working parameter of an equalizer in the OLT;
generate a first data frame, wherein the first data frame comprises the target training sequence; and
send the first data frame to the OLT based on an indication of the second message.

15. The ONU according to claim 14, wherein a length of the target training sequence is greater than a length of the original sequence.

16. The ONU according to claim 14, wherein the target training sequence is one of a plurality of target training sequences, and each target training sequence of the plurality of target training sequences corresponds to a respective identifier.

17. An optical line terminal (OLT), comprising:
a processor and an optical transceiver, wherein the processor and the optical transceiver are connected to each other, and the processor is configured to:
send a first message and a second message to an optical network unit (ONU), wherein a first field in the first message comprises an original sequence, a first pseudo-random sequence is generated by the ONU by using a pseudo-random algorithm based on the original sequence, the first pseudo-random sequence is used as a target training sequence, and a first data frame is generated by the ONU, and wherein the first data frame comprises the target training sequence; and
receive the first data frame, wherein the first data frame is sent by the ONU based on an indication of the second message, and use the target training sequence to determine a working parameter of an equalizer in the OLT.

18. The OLT according to claim 17, wherein a length of the target training sequence is greater than a length of the original sequence.

19. The OLT according to claim 17, wherein the target training sequence is one of a plurality of target training sequences, and each target training sequence of the plurality of target training sequences corresponds to a respective identifier.

* * * * *